United States Patent [19]
Wallestad et al.

[11] Patent Number: 5,511,860
[45] Date of Patent: Apr. 30, 1996

[54] BRAKE SYSTEM FOR HEAVY DUTY SEMI-TRAILER BRAKE SYSTEMS

[75] Inventors: Steven D. Wallestad; Joseph C. Spenser, Kansas City, Mo.

[73] Assignee: Midland Brake, Inc., Kansas City, Mo.

[21] Appl. No.: 346,396

[22] Filed: Nov. 29, 1994

[51] Int. Cl.⁶ ..................................................... B60T 13/00
[52] U.S. Cl. .................... 303/7; 303/41; 303/86
[58] Field of Search ...................... 303/7, 40, 41, 303/9.76, 86, 60, 64, 65; 188/170, 153 R, 153 D

[56] References Cited

U.S. PATENT DOCUMENTS

| | | | |
|---|---|---|---|
| Re. 30,205 | 2/1980 | Carton et al. | 303/7 |
| 4,181,367 | 1/1980 | Herring et al. | 303/7 |
| 4,915,456 | 4/1990 | Gross et al. | 303/9 |
| 5,046,786 | 9/1991 | Johnston et al. | 303/7 |
| 5,061,015 | 10/1991 | Cramer et al. | 303/7 |
| 5,236,250 | 8/1993 | Moody et al. | 303/7 |
| 5,445,440 | 8/1995 | Plantan | 303/7 |

FOREIGN PATENT DOCUMENTS

0387004  12/1990  European Pat. Off. .

*Primary Examiner*—Robert J. Oberleitner
*Assistant Examiner*—Peter M. Poon
*Attorney, Agent, or Firm*—St. Onge Steward Johnston & Reens

[57] ABSTRACT

A braking system is improved by addition of a spring brake pressure protection valve, to prohibit pressurization of the spring brakes prior to the build up of sufficient pressure to insure complete release of the spring brakes. This prevents the significant problems associated with known systems that permit operation of a tractor trailer with partially released spring brakes, which will cause unnecessary wear and reduced fuel economy. The spring brake pressure protection valve is located between the reservoir and the spring brakes, most preferably between the spring brake quick release valve and the spring brakes, or alternately, between the reservoir and the spring brake quick release valve.

20 Claims, 8 Drawing Sheets

BRAKE SYSTEM FOR HEAVY DUTY SEMI-TRAILER BRAKE SYSTEMS

BACKGROUND OF THE INVENTION

1. Field of the Invention

This invention relates to an improved braking system for use in fluid braking systems used on the semi-trailers of highway tractor-trailer vehicles.

2. Discussion of the Prior Art

To meet all of the emergency and service requirements for highway tractor-trailer combinations, while meeting all of the pertinent governmental regulations, including Federal Regulation FMVSS 121 (Docket 90-3, Notice 2), the trucking industry has resorted to a number of trailer brake valve arrangements which have led to complexity, high costs, installation and maintenance difficulties and related problems.

FMVSS 121 is an important safety standard that applies to highway tractor-trailer vehicles; it requires that the spring brakes, which are spring loaded to engage the brake drums when the braking system air pressure drops below the operating pressure necessary to operate the service brakes, become engaged within certain specified time periods. This provides emergency braking when the service brakes become inoperative.

Figure 1:
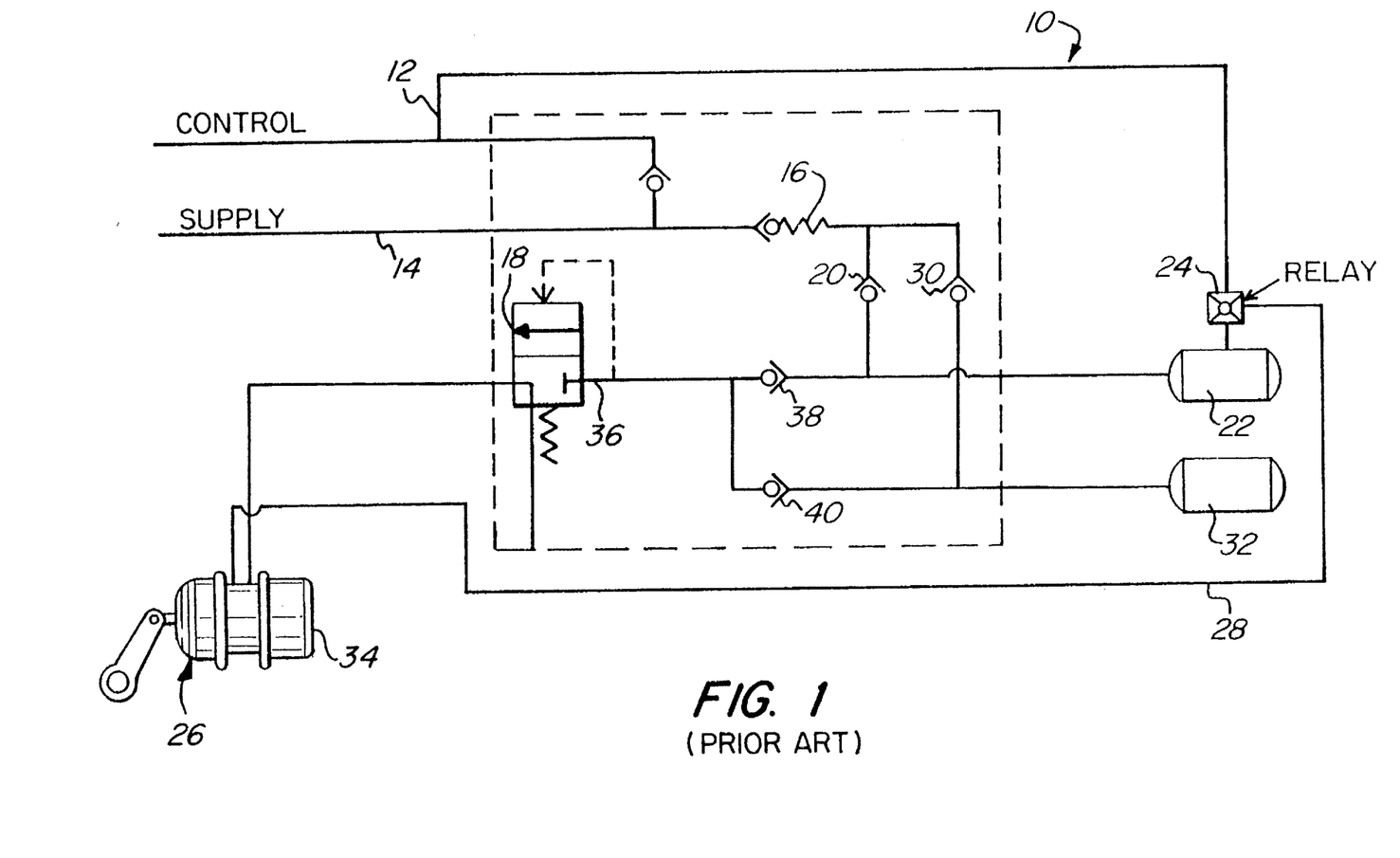
FIG. 1 is a schematic drawing of a prior art trailer brake system.
Figure 2:
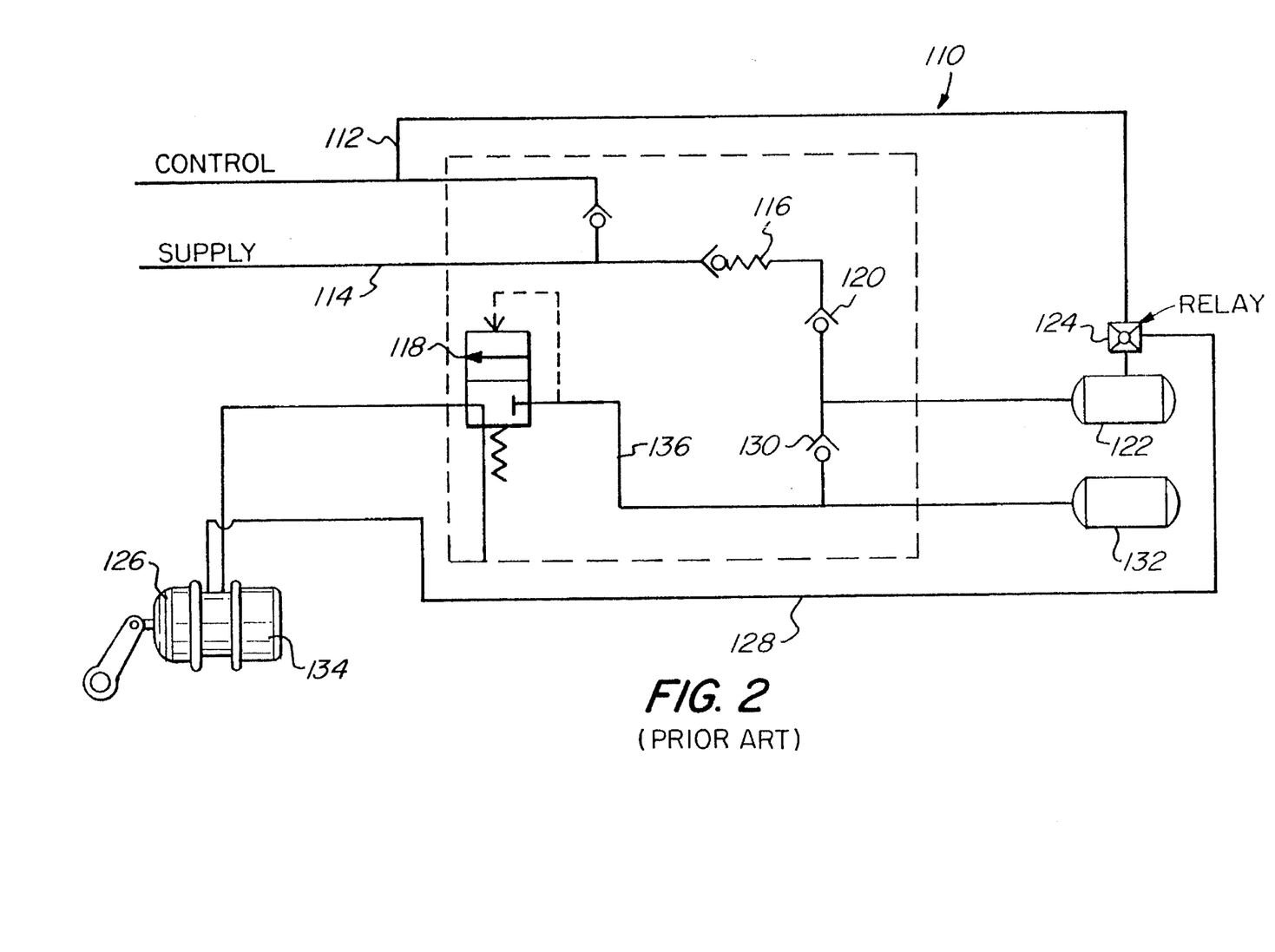
FIG. 2 is a schematic drawing of a prior art trailer brake system.

In a typical semi-trailer braking system, a spring brake valve system will be employed to supply pressurized air to the spring brake chambers to release the spring brakes, and also to exhaust air from the spring brake chambers when the spring brakes are to be again applied. Two prior art braking systems are shown in FIGS. 1 and 2. These braking systems are shown generally at 10 in FIG. 1 and generally at 110 in FIG. 2.

The braking system 10 in FIG. 1 comprises a control air line 12, a supply air line 14, a pressure protection valve 16, and a spring brake valve 18. Supply air line 14 is connected to pressure protection valve 16 and thereafter to spring brake valve 18. A line runs from pressure protection valve 16 to a check valve 20. Check valve 20 connects to a service brake reservoir 22. A relay valve 24 is connected to control air line 12 and is operable to supply air to the service brakes 26 from service brake reservoir 22 via line 28. A line also runs from pressure protection valve 16 to a second check valve 30 that is parallel to check valve 20 and its associated line. Second check valve 30 connects to a spring brake reservoir 32. Supply air is provided to spring brakes 34 from both reservoirs 22, 32. Supply air is provided from reservoir 22 via check valve 38 through line 36 leading to the spring brake valve 18. Supply air is provided from reservoir 32 via check valve 40 which connects to line 36 and spring brake valve 18. These valve components may be housed within a single housing as schematically illustrated by the dashed line surrounding the components. Supply air is available to the spring brakes 34 when there is sufficient air pressure in supply air line 36 to open spring brake valve 18.

The braking system 110 in FIG. 2 comprises a control air line 112, a supply air line 114, a pressure protection valve 116, and a spring brake valve 118. Supply air line 114 is connected to both pressure protection valve 116 and to spring brake valve 118. A line runs from pressure protection valve 116 to a check valve 120. Check valve 120 connects to a service brake reservoir 122. A relay valve 124 is connected to control air line 112 and is operable to supply air to the service brakes 126 from service brake reservoir 122 via line 128. Check valve 120 also connects in series to a second check valve 130. Second check valve 130 connects to a spring brake reservoir 132. Supply air is provided to spring brakes 134 via line 136 and the spring brake valve 118 when there is sufficient air pressure in supply air line 136 to open spring brake valve 118.

It has been found that the brake systems shown in FIGS. 1 and 2 have a serious operating problem that arises as a result of the inclusion of the pressure protection valve 16, 116 with the check valves 20/30, 120, a valve combination which is essentially mandated by FMVSS 121. This is the problem of partial release of the spring brakes, sufficient to permit the tractor-trailer combination to be moved, but insufficient to fully release the spring brakes. This condition occurs when the initial start up and charging of the tractor brake system provides sufficient pressure to supply the tractor reservoirs to a minimum operating pressure (typically about 105 psig), and the operator then releases the tractor and trailer spring brakes and drives off. Often the tractor's compressor does not thereafter provide sufficient air pressure to open trailer pressure protection valve 16 and permit additional charging of the trailer reservoirs. In other circumstances, the pressure on the reservoir side of the check valves 20/30, or 120, may prevent additional charging of the trailer reservoirs by raising the effective pressure of pressure protection valve 16, 116. The insufficient trailer reservoir air pressure causes the spring brakes to only partially release, and drag, with potential for wheel fires, excessive brake wear, drive line wear, tire wear, and poor fuel economy.

It would be desirable if a brake system were configured to prevent release of the spring brakes until there is sufficient air pressure in the reservoirs to insure complete release of the spring brakes.

SUMMARY OF THE INVENTION

It is an object of the present invention to provide an improved brake system for heavy-duty highway trailers which performs all of the required functions of a tractor trailer braking system and otherwise meets all of the requirements of the aforementioned Federal Regulation.

It is another object to provide a brake system for heavy-duty highway semi-trailers which prevents problems associated with operation of a tractor-trailer where there is only partial release of the spring brakes.

It is another object to provide a brake system which prohibits release of the spring brakes unless there is sufficient reservoir pressure to fully release the spring valves.

These objects are achieved by an improved brake system in accordance with the invention which has a spring brake pressure protection valve provided in a line connecting the reservoir with the spring brake. The spring brake pressure protection valve is closed to prevent passage of air into the spring brake chambers until air pressure at a reservoir side of the spring brake pressure protection valve is sufficient to fully release the spring brake. Once this pressure is achieved, the spring brake pressure protection valve is opened, and is maintained in an open position so long as the air pressure at its reservoir side is sufficient to fully release the spring brake.

There are three preferred embodiments of the invention. In one embodiment, the spring brake pressure protection valve is located between a spring brake quick release valve and the spring brake chamber, and is preferably outside of a valve module containing the spring brake quick release valve. In this embodiment, the spring brake pressure protection valve is preferably coupled with a parallel check valve openable to exhaust the spring brake chambers, particularly when the spring brake pressure protection valve is closed.

In another embodiment, the spring brake pressure protection valve may be located immediately upstream of an inlet or reservoir side of the spring brake quick release valve. In another embodiment, the spring brake pressure protection valve is located adjacent a reservoir, between the reservoir and a line connecting to both the supply air inlet and the spring brake quick release valve. In this last embodiment the spring brake pressure protection valve is again preferably coupled with a parallel check valve openable to provide supply air to the reservoir, particularly when the spring brake pressure protection valve is closed.

In each embodiment, the spring brake pressure protection valve is maintained in a closed position until fluid pressure at a reservoir side of said spring brake pressure protection valve is at least 85 psig.

Other objects, aspects and features of the present invention in addition to those mentioned above will be pointed out in or will be understood from the following detailed description provided in conjunction with the accompanying drawings.

BRIEF DESCRIPTION OF THE DRAWINGS

The present invention may be more clearly understood from the following description of a specific and preferred embodiment read in conjunction with the accompanying schematic and detailed drawings; wherein.

It should be understood that the drawings are not necessarily to exact scale and that the embodiments of the invention may be constructed in different ways within the scope of the invention. It should be also understood when referring to physical relationships of components by terms such as "upper", "lower", "upward", "downward", "vertical", "horizontal", "left", "right" or the like, such terms usually have reference to the orientation depicted in the drawings. Actual embodiments or installations thereof may differ, depending upon the particular semi-trailer for which the braking system is designed. It should also be understood that the terms "passageway" and "line" include not only internal passages in a valve module, but also separate and external connecting passages, as well as fluid communicating spaces, chambers and the like.

DETAILED DESCRIPTION OF DRAWINGS

Figure 3A:
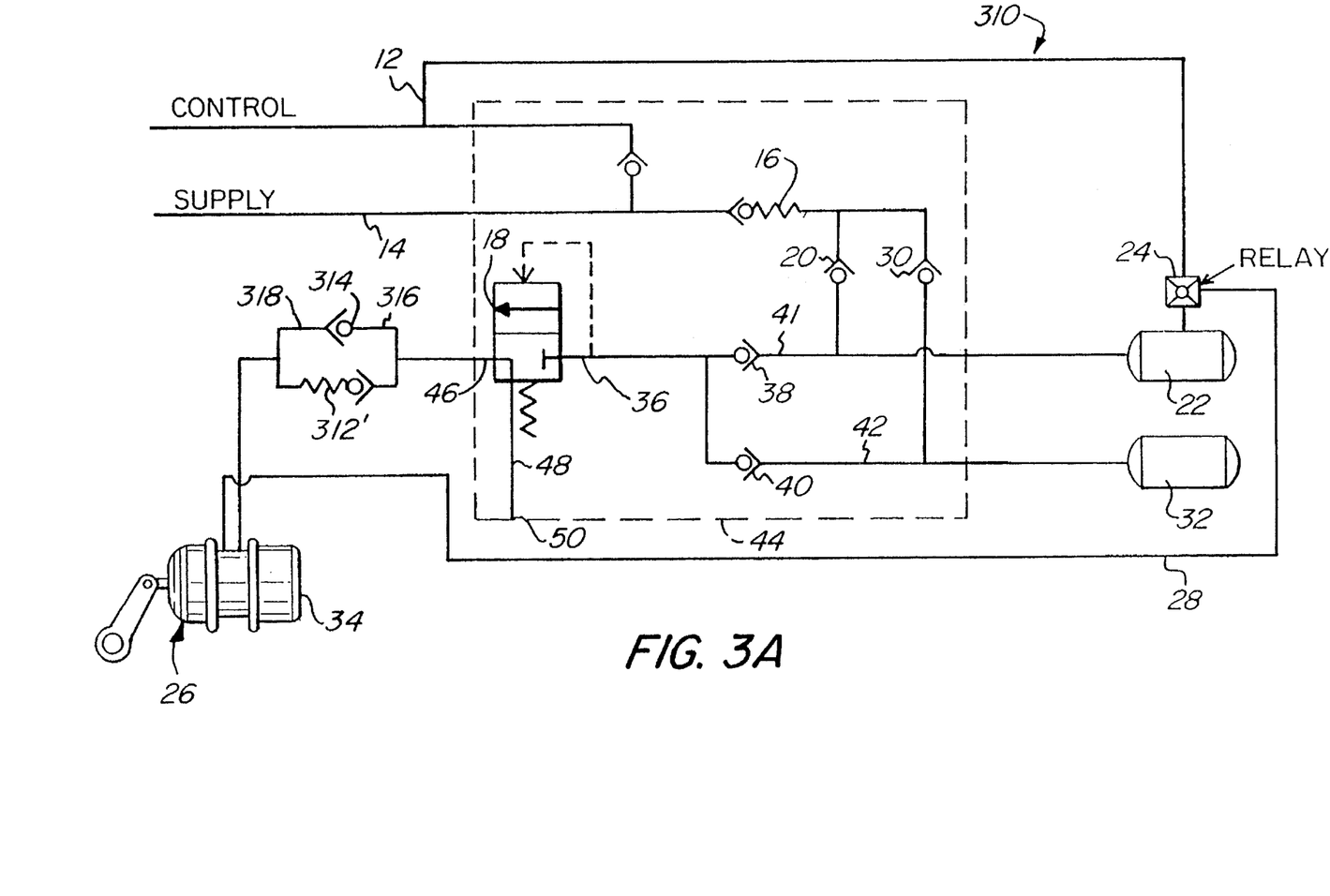
FIGS. 3A–3C are schematic drawings illustrating different embodiments of the invention as applied to the prior art trailer system of FIG. 1.
Figure 3B:
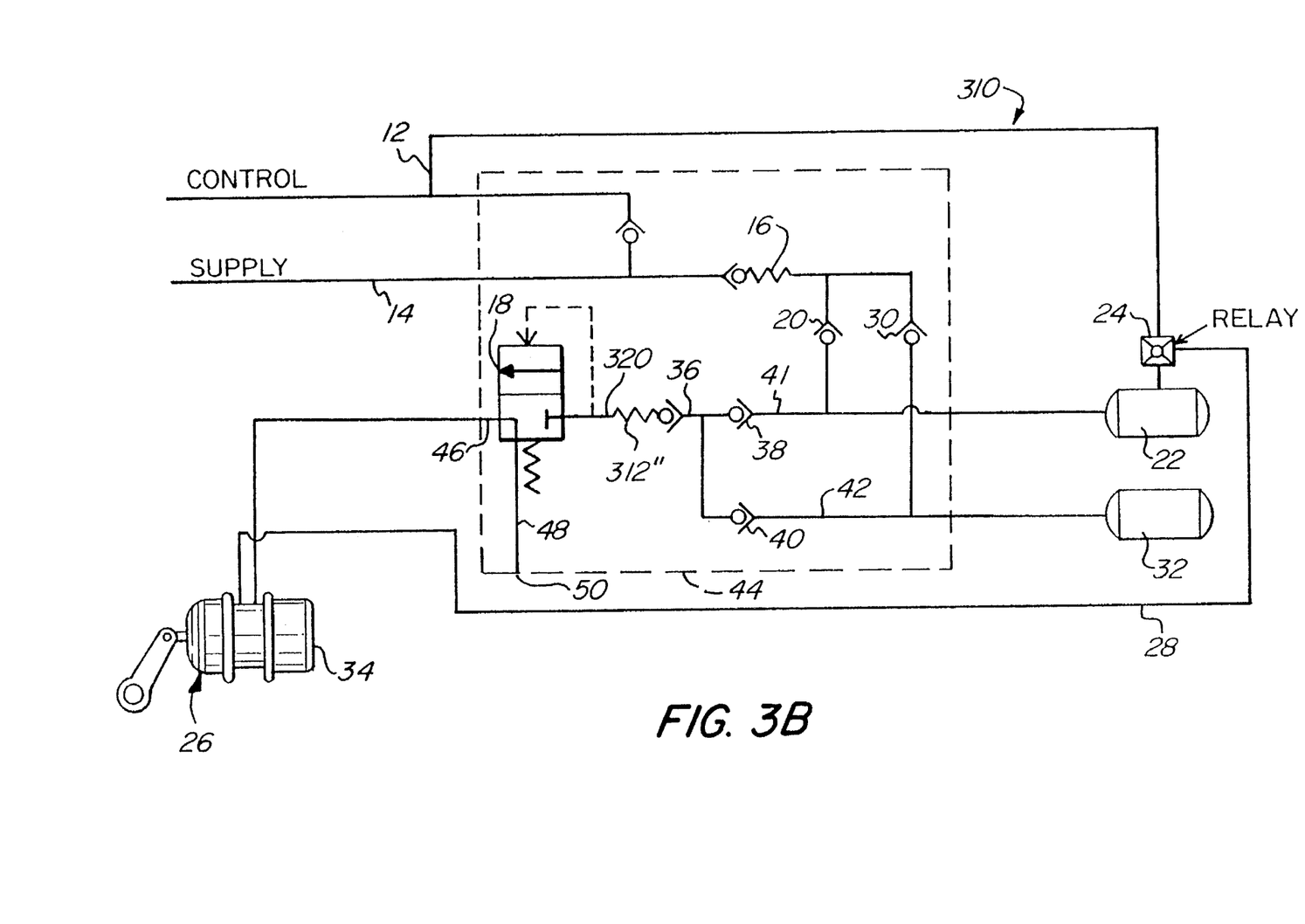
Figure 3C:
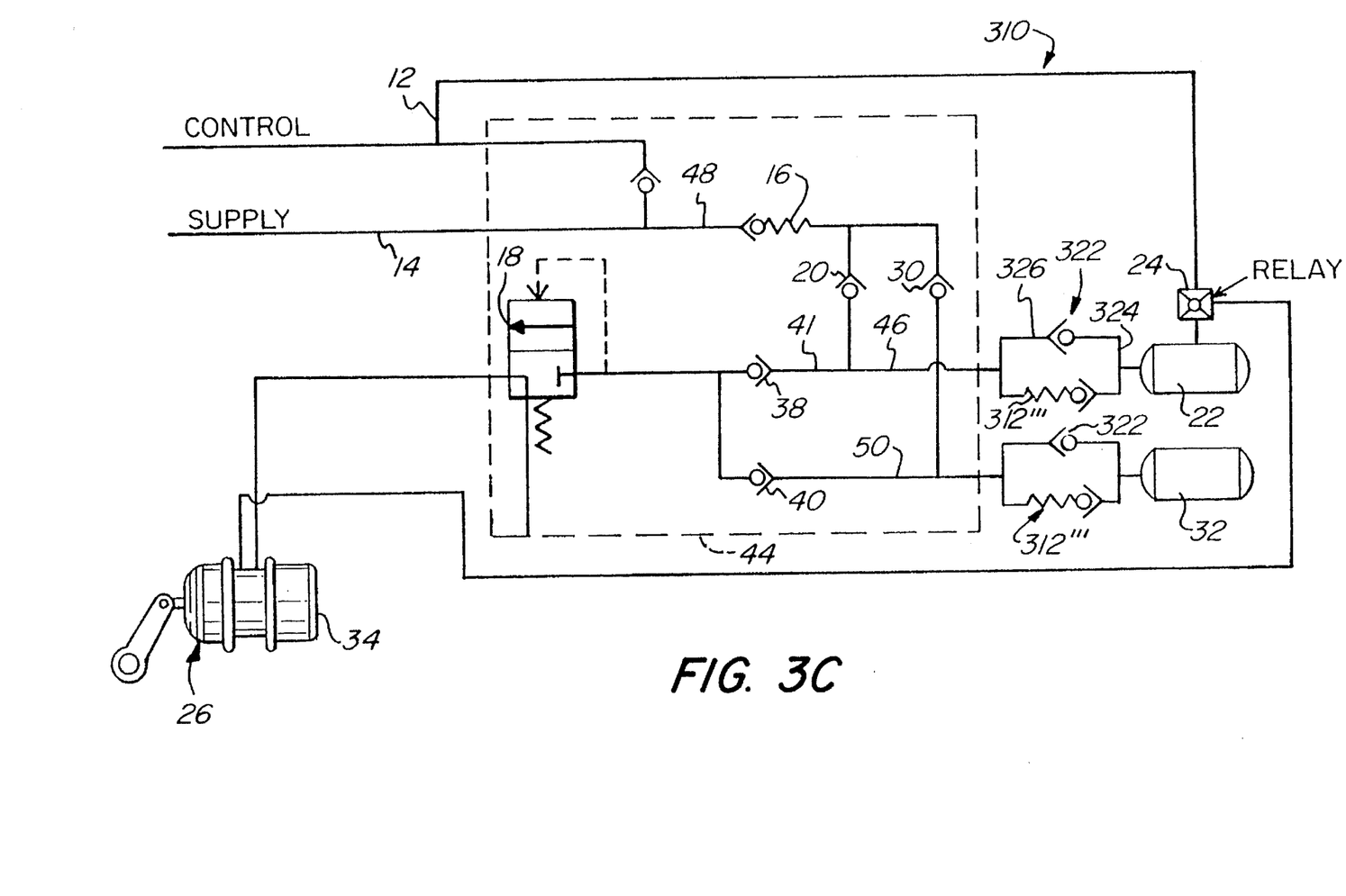
Figure 4A:
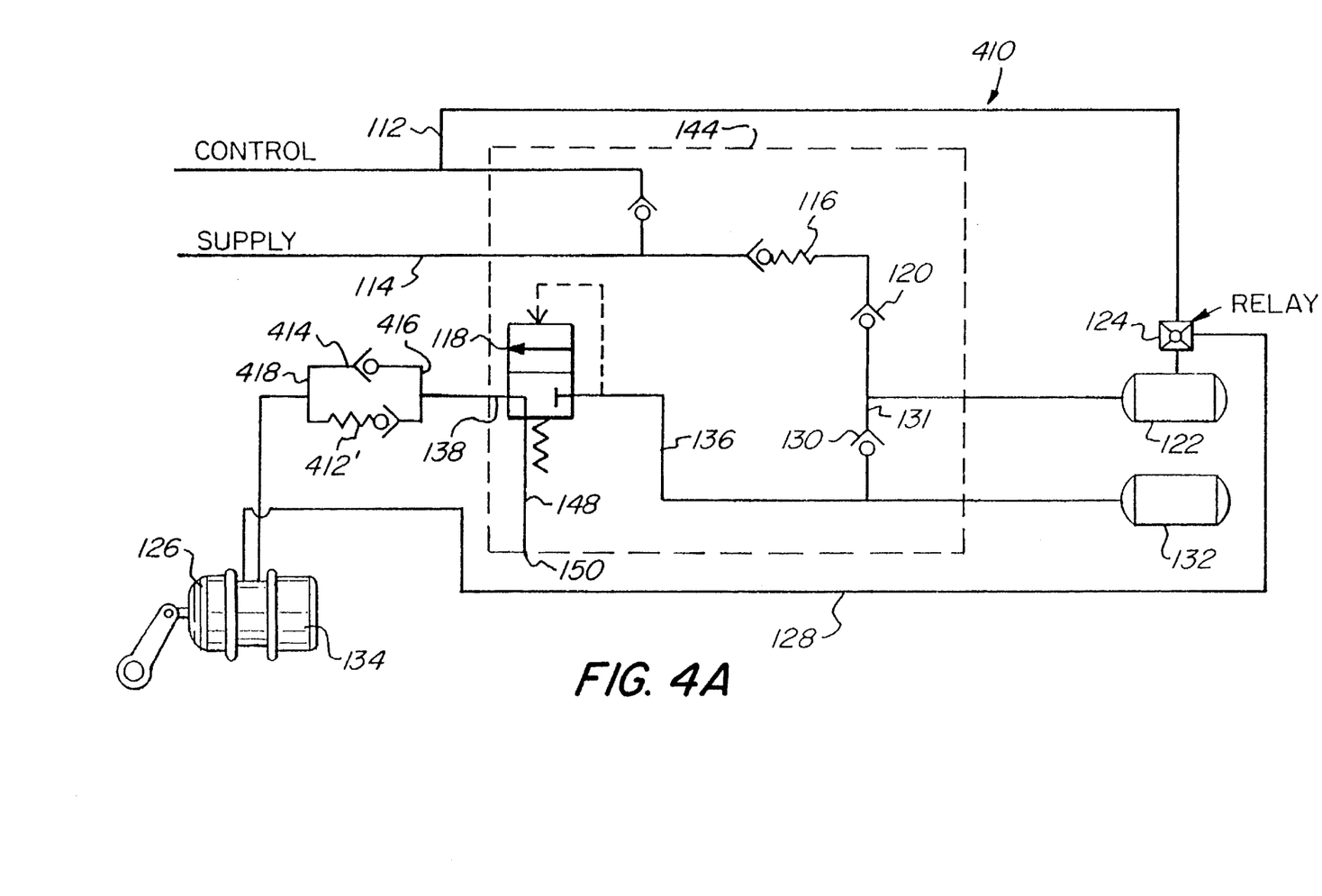
FIGS. 4A–4C are schematic drawings illustrating different embodiments of the invention as applied to the prior art trailer system of FIG. 2.
Figure 4B:
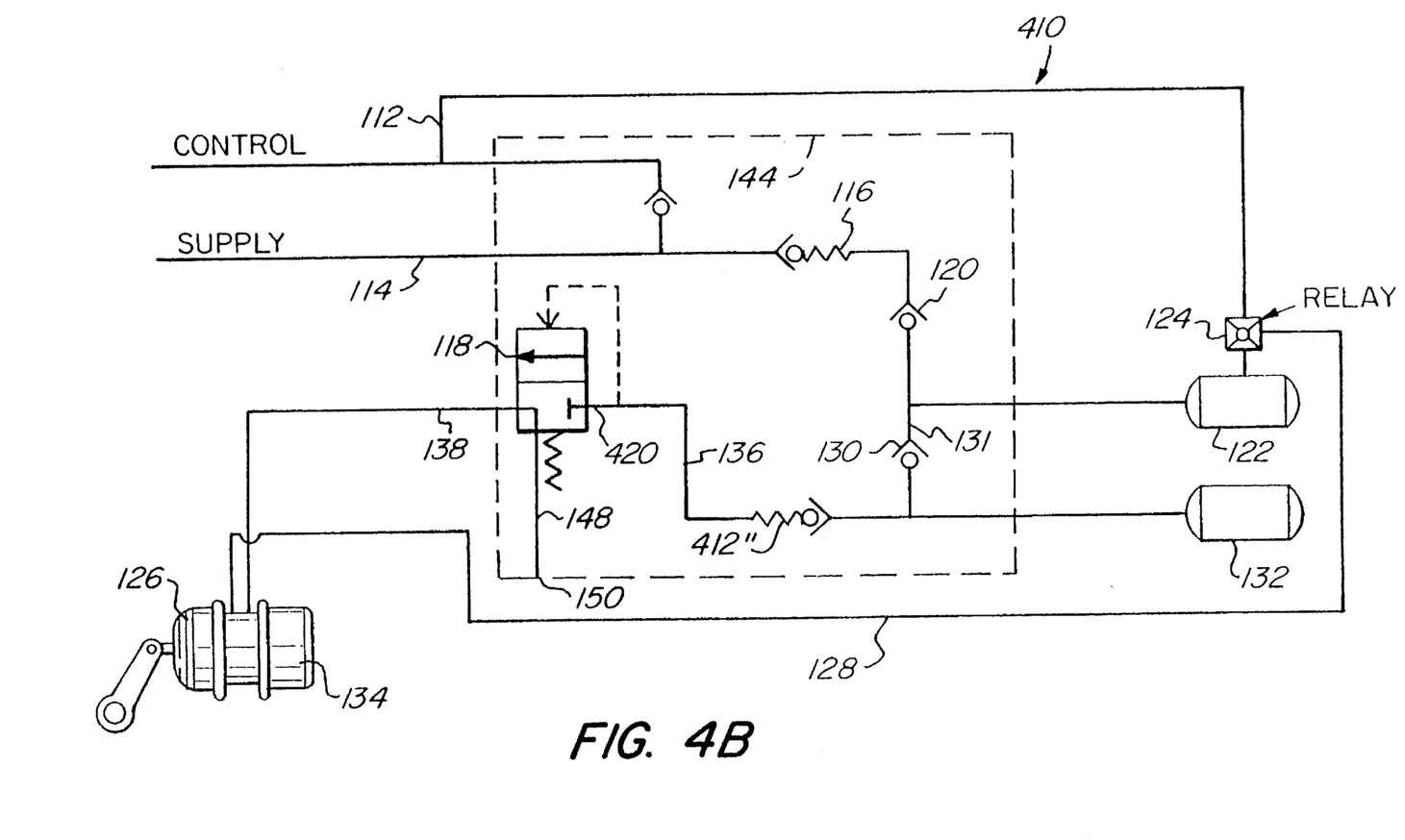
Figure 4C:
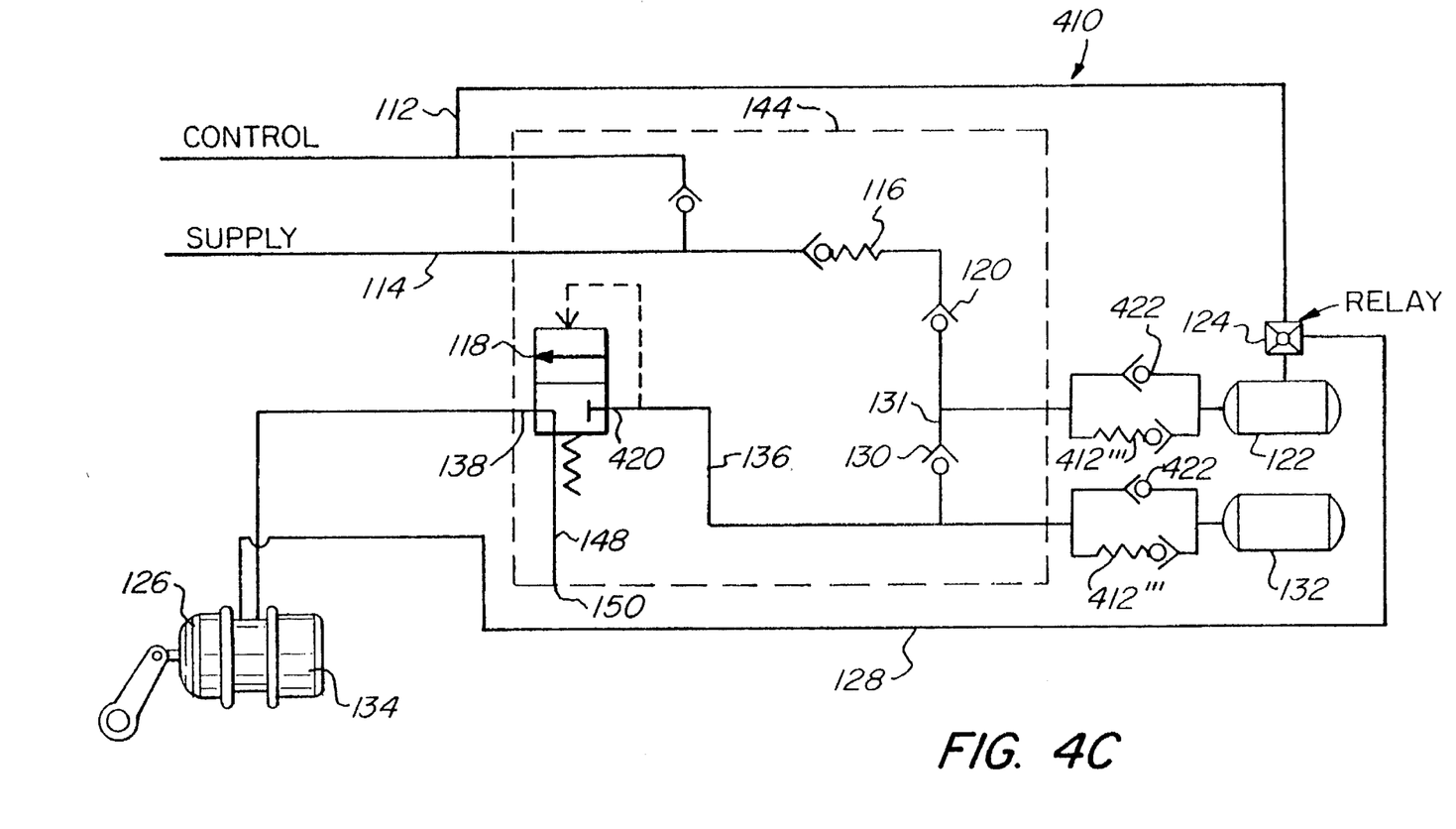

In FIGS. 3A–3C, the prior art elements of the improved brake system of FIGS. 3A–3C are identified using the same numbers as used to identify parts of the prior art brake system shown schematically in FIG. 1. Similarly, in FIGS. 4A–4C, the prior art elements of the improved brake system of FIGS. 4A–4C are identified using the same numbers as used to identify parts of the prior art brake system shown schematically in FIG. 2.

Referring now to FIGS. 3A–3C, the improved brake system 310 comprises a control air line 12, a supply air line 14, a pressure protection valve 16, and a spring brake valve 18. Supply air line 14 is connected to both pressure protection valve 16 and to spring brake quick release valve 18. A line runs from pressure protection valve 16 to a check valve 20. Check valve 20 connects to a service brake reservoir 22. A relay valve 24 is connected to control air line 12 and is operable to supply air to the service brakes 26 from service brake reservoir 22 via line 28. A line also runs from pressure protection valve 16 to a second check valve 30. Second check valve 30 connects to a spring brake reservoir 32. Supply air is provided to reservoirs 22 and 32 via pressure protection valve 16 and respective check valves 20 and 30. Supply air is provided to spring brake chambers 34 from both reservoirs 22, 32 and via supply lines 41 and 42. Supply air is provided from reservoir 22 and supply line 41 via check valve 38 through line 36 leading to the spring brake valve 18. Supply air is provided from reservoir 32 and supply line 42 via check valve 40 which connects to line 36 and spring brake valve 18. These valve components may be housed within a single housing 44 as schematically illustrated by the dashed line surrounding the components. Supply air is available to the spring brake chambers 34 when there is sufficient air pressure in supply air line 36 to open spring brake quick release valve 18 by providing sufficient pressure to overcome the spring bias of spring brake quick release valve 18. In accordance with the invention quick release valve 18 may take other forms as are known in the art. Spring brakes 26 are vented to the atmosphere via line 46 to spring brake quick release valve 18, and the line 48, to spring brake exhaust 50 when the air pressure in line 14 is reduced.

A spring brake pressure protection valve 312 is provided in a spring brake line connecting the reservoirs 22, 32 with the spring brake chambers 34. The spring brake pressure protection valve 312 is closed to prevent passage of air into the spring brake chambers 34 until air pressure at a reservoir side of the spring brake pressure protection valve 312 is sufficient to fully release the spring brake. Once this pressure is achieved, the spring brake pressure protection valve 312 is opened, and is maintained in an open position so long as the air pressure at its reservoir side is sufficient to fully release the spring brake.

There are three preferred embodiments of the invention. In the embodiment shown in FIG. 3A, the spring brake pressure protection valve 312' is located between the spring brake quick release valve 18 and the spring brake chamber 34. Valve 312' is preferably located outside of the valve housing 44 containing the spring brake quick release valve 18. In this embodiment, the spring brake pressure protection valve 312' is preferably coupled with a parallel check valve 314 openable to exhaust the spring brake chambers, particularly when the spring brake pressure protection valve is closed. Check valve 314 is reversed so that air pressure from its inlet side 316 connecting to the spring brake quick release valve 18 that exceeds air pressure on its outlet side 318 connecting to the spring brake chambers 34 will cause the check valve 314 to close; similarly, air pressure at its inlet side 316 that is less than air pressure on its outlet side 318 will cause the check valve 314 to open.

In another embodiment, shown generally in FIGS. 3B and 3C, the spring brake pressure protection valve is located between the reservoir 22 and the spring brake quick release valve 18. In the embodiment shown in FIG. 3B, the spring brake pressure protection valve 312" is located immediately upstream of an inlet or reservoir side 320 of the spring brake quick release valve 18. In the embodiment shown in FIG. 3C, the spring brake pressure protection valve 312''' is located adjacent reservoir 22, between the reservoir 22 and a line 46 connecting the reservoir to the supply air inlet line 48, and to the spring brake quick release valve 18. In this latter embodiment of FIG. 3C the spring brake pressure protection valve 312''' is again preferably coupled with a parallel check valve 322 openable to provide supply air to the reservoir 22, particularly when the spring brake pressure protection valve 312''' is closed. As can also be seen, in the embodiment in FIG. 3C there are two such spring brake pressure protection valves 312''', each of which is coupled with a parallel check valve 316. One of spring brake pressure protection valves 312''' is located adjacent each one of the reservoirs 22 and 32.

Check valve 322 is reversed so that air pressure from its inlet side 324 connecting to supply air line 48 that exceeds air pressure at its outlet side 326 connecting to reservoirs 22 or 32 will cause the check valve 322 to open; if air pressure at its inlet side 324 is less than the air pressure at its outlet side 326, then the check valve 322 will close.

Pressure protection valve 312 is preferably a spring biased check valve, most preferably a molded rubber check valve.

In each embodiment, the spring brake pressure protection valve 312 is maintained in a closed position until fluid pressure at a reservoir side of said spring brake pressure protection valve is at least 85 psig.

Referring now to FIGS. 4A–4C, the brake system 410 comprises a control air line 112, a supply air line 114, a pressure protection valve 116, and a spring brake valve 118. Supply air line 114 is connected to both pressure protection valve 116 and to spring brake valve 118. A line runs from pressure protection valve 116 to a check valve 120. Check valve 120 connects to a service brake reservoir 122. A relay valve 124 is connected to control air line 112 and is operable to supply air to the service brakes 126 from service brake reservoir 122 via line 128. Check valve 120 connects to a second check valve 130 via line 131. Second check valve 130 connects to a spring brake reservoir 132.

While shown as a single vessel or tank, the reservoirs 22, 32, 122 and 132 may take the form of a plurality of vessels in series or parallel, particularly if size and space limitations or configurations are factors.

Supply air is provided to spring brakes 134 via line 136 and the spring brake valve 118 when there is sufficient air pressure in supply air line 114 to open spring brake valve 118.

Supply air is provided to reservoirs 122 and 132 via pressure protection valve 116 and respective check valves 120 and 130. Supply air is provided to spring brake chambers 134 from both reservoirs 122, 132 via supply lines 136 and 138. These valve components may be housed within a single housing 144 as schematically illustrated by the dashed line surrounding the components.

Supply air is available to the spring brake chambers 134 when there is sufficient air pressure in supply air line 136 to open spring brake quick release valve 118 by providing sufficient pressure to overcome the spring bias of spring quick release valve 118. In accordance with the invention quick release valve 118 may take other forms as are known in the art. Spring brakes 126 are vented to the atmosphere via lines 138 to spring brake quick release valve 118, and the line 148, to spring brake exhaust 150 when the air pressure in line 114 is reduced.

A spring brake pressure protection valve 412 is provided in a spring brake line connecting the reservoirs 122, 132 with the spring brake chambers 134. The spring brake pressure protection valve 412 is closed to prevent passage of air into the spring brake chambers 134 until air pressure at a reservoir side of the spring brake pressure protection valve 412 is sufficient to fully release the spring brake. Once this pressure is achieved, the spring brake pressure protection valve 412 is opened, and is maintained in an open position so long as the air pressure at its reservoir side is sufficient to fully release the spring brake.

There are three preferred embodiments of the invention. In the embodiment shown in FIG. 3A, the spring brake pressure protection valve 412' is located between the spring brake quick release valve 118 and the spring brake chamber 134. Valve 412' is preferably located outside of the valve housing 144 containing the spring brake quick release valve 118. In this embodiment, the spring brake pressure protection valve 412' is preferably coupled with a parallel check valve 414 openable to exhaust the spring brake chambers 134, particularly when the spring brake pressure protection valve 118 is closed. Check valve 414 is reversed so that air pressure from its inlet side 416 connecting to the spring brake quick release valve 118 that exceeds air pressure on its outlet side 418 connecting to the spring brake chambers 134 will cause the check valve 414 to close; similarly, air pressure at its inlet side 416 that is less than air pressure on its outlet side 418 will cause the check valve 414 to open.

In another embodiment, shown generally in FIGS. 4B and 4C, the spring brake pressure protection valve 412 is located between the reservoir 122 and the spring brake quick release valve 118. In the embodiment shown in FIG. 4B, the spring brake pressure protection valve 412" is located immediately upstream of an inlet or reservoir side 420 of the spring brake quick release valve 118. In the embodiment shown in FIG. 4C, the spring brake pressure protection valve 412''' is located adjacent reservoir 122, between the reservoir 122 and a line 131. In this latter embodiment of FIG. 4C the spring brake pressure protection valve 412''' is again preferably coupled with a parallel check valve 422 openable to provide supply air to the reservoir 122, particularly when the spring brake pressure protection valve 412''' is closed. As can also be seen, in the embodiment in FIG. 4C there are two such spring brake pressure protection valves 412''', each of which is coupled with a parallel check valve 422. One of spring brake pressure protection valves 412''' is located adjacent each one of the reservoirs 122 and 132.

Check valve 422 is reversed so that air pressure from its inlet side 424 connecting to supply air line 148 that exceeds air pressure at its outlet side 426 connecting to reservoirs 122 or 132 will cause the check valve 422 to open; if air pressure at its inlet side 424 is less than the air pressure at its outlet side 426, then the check valve 422 will close.

Pressure protection valve 412 is preferably a spring biased check valve, most preferably a molded rubber check valve.

In each embodiment, the spring brake pressure protection valve 412 is maintained in a closed position until fluid pressure at a reservoir side of said spring brake pressure protection valve is at least 85 psig.

SUMMARY OF OPERATION

Referring now generally to FIGS. 3A–3C and 4A–4C, supply air enters valve systems 310, 410 via line 14, 114. Air pressure will begin to rise in line 14, 114 to the point at which it causes the pressure protection valve 16, 116 to open at about 70 psig. Thereafter reservoirs 22, 32, 122, 132 will begin to be charged with pressurized air. The spring brake valve 18, 118 will shift and open when there is sufficient pressure in line 36, 136. The spring brake valve 18, 118 will allow pressurized air to be available to the spring brake chambers 34, 134 when the spring brake pressure protection valves 312', 412' are also opened. The pressurized air entering the system for charging reservoirs 22, 32, 122, 132 of the trailer is prevented from charging the spring brake chambers 34, 134 until the pressure protection valves 312, 412 open. As a result of the arrangement of the spring brake pressure protection valves 312, 412, pressurized air cannot go directly from the supply line 14, 114 into the spring brake chambers 34, 134. This forecloses the possibility of the trailer being moved until the system pressure is sufficient to fully release the spring brakes.

When reservoirs 22 and 32, 122 and 132 are charged to about 85 psig, the spring brake pressure protection valves 312, 412 will open to charge the spring brake reservoirs 34, 134 and release the spring brakes.

Typically, the service brakes will be operable at about 35 psig, and the spring brakes will fully release when the pressure in the spring brake chambers 22, 122 is greater than 70 psig. Consequently, the entire braking system will become fully operable when the spring brakes are released.

Control air signals from the tractor enter relay valve module 24, 124 and operate in a conventional manner, allowing air from reservoirs 22, 122 to fill the service brake chambers 26, 126 of the brake actuators, resulting in brake application through conventional mechanical means.

In the event of a failure of air reservoirs 22 or 32, 122 or 132, the one-way check valves 20, 30, 38, 40, and 120, 130 will prevent the decay of air pressure in the spring brake chambers. This will allow the driver to pull the trailer off of the road using the tractor brakes for control prior to complete application of the spring brakes. The pressure protection valve 16, 116 will maintain a minimum air pressure of about 70 psig in the supply line, thus allowing the tractor to maintain service braking capacity.

Because most modern-day trailer brake systems employ pressurized air as the fluid medium for actuation and control purposes and such use is contemplated in the presently-known best-mode embodiment described herein, the disclosure herein set forth assumes such medium to be used. As those skilled in the art will recognize, however, the invention is not necessarily limited thereto and the inventive concept may be adapted to other fluid media.

As is apparent from the above description, the brake system of the present invention copes with the operating and safety requirements of modern semi-trailers. It meets the requirements of present pertinent Federal Regulations and prevents operation of the vehicle with a prematurely or partially released spring brake.

We claim:

1. In a brake system for a trailer having a supply fluid line connected to a reservoir by a pressure protection valve and a check valve, said reservoir being operably connected to a spring brake, the improvement comprising:

a spring brake pressure protection valve provided in a line connecting said reservoir with said spring brake, said spring brake pressure protection valve being maintained in a closed position until fluid pressure at a reservoir side of said spring brake pressure protection valve is sufficient to fully release said spring brake, said spring brake pressure protection valve being maintained in an open position when fluid pressure at said reservoir side thereof is sufficient to fully release said spring brake.

2. In a brake system in accordance with claim 1, wherein a spring brake valve is located between said reservoir and said spring brake, and wherein said spring brake pressure protection valve is contained in a line connecting said spring brake valve with said spring brake.

3. In a brake system in accordance with claim 2, further comprising a check valve located in a line connecting said spring brake valve with said spring brake, said check valve and line being located in parallel with said line containing said spring brake pressure protection valve, said check valve being closed when a fluid pressure on a spring brake valve side of said check valve exceeds a fluid pressure on a spring brake side of said check valve, said check valve being open when a fluid pressure on said spring brake valve side of said check valve is less than a fluid pressure on said spring brake side of said check valve.

4. In a brake system in accordance with claim 1, wherein a spring brake valve is located between said reservoir and said spring brake, and wherein said spring brake pressure protection valve is contained in a line connecting said reservoir with said spring brake valve.

5. In a brake system in accordance with claim 4, wherein there are two of said reservoirs, and where said two reservoirs are separately connected to a single line connecting to said spring brake valve, and wherein said spring brake pressure protection valve is contained in said single line.

6. In a brake system in accordance with claim 4, wherein there are two of said reservoirs, and wherein there are two reservoir lines, one reservoir line connected to one of said reservoirs, the other reservoir line connecting to the other of said reservoirs, said two reservoir lines both being interconnected to each other and to said supply fluid line, and wherein there are two of said spring brake pressure protection valves, one of said spring brake pressure protection valves being located in one of said reservoir lines, the other of said spring brake pressure protection valves being located in the other of said reservoir lines.

7. In a brake system in accordance with claim 6, further comprising two check valves, one said check valve being located in a line parallel with a portion of said one reservoir line containing said one spring brake pressure protection valve, the other said check valve being located in a line parallel with a portion of said other reservoir line containing said other spring brake pressure protection valve, said check valves being closed when a fluid pressure on a reservoir side of said check valves exceeds a fluid pressure on a supply fluid line side of said check valves, said check valves being open when a fluid pressure on said reservoir side of said check valves is less than a fluid pressure on said supply fluid line side of said check valves.

8. In a brake system in accordance with claim 1, wherein said spring brake pressure protection valve is maintained in a closed position until fluid pressure at a reservoir side of said spring brake pressure protection valve is at least 85 psig.

9. In a brake system for a trailer having a supply air line connected to a reservoir by a pressure protection valve and a check valve, said reservoir being operably connected to a spring brake by a spring brake line containing a spring brake quick release valve located between said reservoir and said spring brake, the improvement comprising:

a spring brake pressure protection valve provided in a portion of said spring brake line connecting said spring brake quick release valve with said spring brake, said spring brake pressure protection valve being maintained in a closed position until air pressure at a spring brake quick release valve side of said spring brake pressure protection valve is sufficient to fully release said spring brake, said spring brake pressure protection valve being maintained in a open position so long as air pressure at said spring brake quick release valve thereof is sufficient to fully release said spring brake; and a check valve located in a line in parallel with said portion of said spring brake line containing said spring brake pressure protection valve, said check valve being closed when an air pressure on a spring brake quick release valve side of said check valve exceeds an air pressure on a spring brake side of said check valve, said check valve being open when an air pressure on said spring brake quick release valve side of said check valve is less than an air pressure on said spring brake side of said check valve.

10. In a brake system in accordance with claim 9, wherein said spring brake pressure protection valve is maintained in a closed position until fluid pressure at said spring brake quick release valve side of said spring brake pressure protection valve is at least 85 psig.

11. In a brake system for a trailer having a supply air line connected to a reservoir by a pressure protection valve and a check valve, said reservoir being operably connected to a spring brake by a spring brake line containing a spring brake quick release valve located between said reservoir and said spring brake, the improvement comprising:

a spring brake pressure protection valve provided in a portion of said spring brake line connecting said reservoir with said spring brake quick release valve, said spring brake pressure protection valve being maintained in a closed position until air pressure at a reservoir side of said spring brake pressure protection valve is sufficient to fully release said spring brake, said spring brake pressure protection valve being maintained in an open position when air pressure at said reservoir side thereof is sufficient to fully release said spring brake; and a check valve located in a line in parallel with said portion of said spring brake line containing said spring brake pressure protection valve, said check valve being closed when an air pressure on said reservoir side of said check valve exceeds an air pressure on a spring brake quick release valve side of said check valve, said check valve being open when an air pressure on said reservoir side of said check valve is less than an air pressure on said spring brake quick release valve side of said check valve.

12. In a brake system in accordance with claim 11, wherein said spring brake pressure protection valve is maintained in a closed position until fluid pressure at said reservoir side of said spring brake pressure protection valve is at least 85 psig.

13. In a brake system for a trailer having a supply air line connected to a reservoir by a pressure protection valve and a check valve, said reservoir being operably connected to a spring brake by a spring brake line containing a spring brake quick release valve located between said reservoir and said spring brake, the improvement comprising:

a spring brake pressure protection valve provided in a portion of said spring brake line connecting said reservoir with said spring brake quick release valve, said spring brake pressure protection valve being maintained in a closed position until air pressure at a reservoir side of said spring brake pressure protection valve is sufficient to fully release said spring brake, said spring brake pressure protection valve being maintained in a open position when air pressure at said reservoir side thereof is sufficient to fully release said spring brake.

14. In a brake system in accordance with claim 13, wherein said spring brake pressure protection valve is maintained in a closed position until fluid pressure at said reservoir side of said spring brake pressure protection valve is at least 85 psig.

15. A brake system comprising:

a valve assembly, including a valve housing having a plurality of ports therein, said ports comprising a supply air inlet, at least one spring brake outlet, at least one reservoir outlet, and a spring brake exhaust; said ports extending through said housing;

a pressure protection valve in fluid communication with a passageway connected to said supply air inlet, said pressure protection valve being openable at a selected supply air pressure to connect said supply air inlet to a first check valve and to a passageway leading to said reservoir outlet;

a spring brake quick release valve operable to open when a pressure at an upstream side thereof is sufficient to displace said spring brake quick release valve to connect said supply air inlet to be in fluid communication with said spring brake outlet, said spring brake quick release valve being operable in an exhaust mode, when a pressure at an outlet side thereof is greater than a pressure at an inlet side thereof, to connect said spring brake outlet with said spring brake exhaust;

an air reservoir for containing pressurized air, said air reservoir being operably connected to said reservoir outlet;

a spring brake chamber, for release of spring brakes by pressurization of said spring brake chamber, operably connected to said spring brake outlet;

a control air line;

a relay valve operably connected to said reservoir and to said control air line;

a service brake chamber for operation of service brakes operably connected to said relay valve upon increase of control air pressure; and a spring brake pressure protection valve located in fluid communication with said reservoir and said spring brake chamber, said spring brake pressure protection valve being maintained in a closed position until air pressure at a reservoir side of said spring brake pressure protection valve is sufficient to fully release said spring brake, said spring brake pressure protection valve being maintained in an open position when air pressure at said reservoir side thereof is sufficient to fully release said spring brake.

16. A brake system in accordance with claim 15, wherein said spring brake pressure protection valve is contained in a line connecting said spring brake quick release valve with said spring brake chamber, and further comprising a check valve located in a line running in parallel with said line containing said spring brake pressure protection valve, said check valve being closed when an air pressure on a spring brake quick release valve side of said check valve exceeds an air pressure on a spring brake chamber side of said check valve, said check valve being open when an air pressure on said spring brake quick release valve side of said check valve is less than an air pressure on said spring brake chamber side of said check valve.

17. A brake system in accordance with claim 15, wherein said spring brake pressure protection valve is contained in a line connecting said reservoir with said spring brake quick release valve.

18. In a brake system in accordance with claim 17, wherein there are two of said reservoirs, and where said two reservoirs are separately connected to a single line connecting to said spring brake quick release valve, and wherein said spring brake pressure protection valve is contained in said single line.

19. In a brake system in accordance with claim 17, wherein there are two of said reservoirs, and wherein there are two reservoir lines, one reservoir line connected to one of said reservoirs, the other reservoir line connecting to the other of said reservoirs, said two reservoir lines both being interconnected to each other and to a supply air line, and wherein there are two of said spring brake pressure protection valves, one of said spring brake pressure protection valves being located in one of said reservoir lines, the other of said spring brake pressure protection valves being located in the other of said reservoir lines, and two check valves, one said check valve being located in a line parallel with a portion of said one reservoir line containing said one spring brake pressure protection valve, the other said check valve being located in a line parallel with a portion of said other reservoir line containing said other spring brake pressure protection valve, said check valves being closed when an air pressure on said reservoir side of said check valves exceeds an air pressure on a supply air line side of said check valves, said check valves being open when an air pressure on said reservoir side of said check valves is less than an air pressure on said supply air line side of said check valves.

20. A brake system in accordance with claim 15, wherein said spring brake pressure protection valve is maintained in a closed position until an air pressure at said reservoir side of said spring brake pressure protection valve is at least 85 psig.

* * * * *